(12) United States Patent
Christmas

(10) Patent No.: US 12,105,473 B2
(45) Date of Patent: Oct. 1, 2024

(54) IMAGE PROCESSING SYSTEMS AND METHODS

(71) Applicant: DUALITAS LTD, Milton Keynes (GB)

(72) Inventor: Jamieson Christmas, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 570 days.

(21) Appl. No.: 17/410,586

(22) Filed: Aug. 24, 2021

(65) Prior Publication Data

US 2022/0057751 A1     Feb. 24, 2022

(30) Foreign Application Priority Data

Aug. 24, 2020 (GB) ..................................... 2013203

(51) Int. Cl.
| | |
|---|---|
| *G03H 1/22* | (2006.01) |
| *G03H 1/02* | (2006.01) |
| *G06T 3/00* | (2024.01) |
| *G06T 3/4084* | (2024.01) |

(52) U.S. Cl.
CPC ............. *G03H 1/2294* (2013.01); *G06T 3/00* (2013.01); *G06T 3/4084* (2013.01); *G03H 2001/0224* (2013.01)

(58) Field of Classification Search
CPC .......... G03H 1/2294; G03H 2001/0224; G06T 3/00; G06T 3/4084
See application file for complete search history.

(56) References Cited

U.S. PATENT DOCUMENTS

| | | | |
|---|---|---|---|
| 8,706,794 B1 * | 4/2014 | Fleizach | G06F 7/4806 |
| | | | 708/622 |
| 2010/0135547 A1 * | 6/2010 | Lee | G06T 3/4084 |
| | | | 382/128 |
| 2010/0189320 A1 | 7/2010 | Dewaele | |
| 2012/0236021 A1 | 9/2012 | Parmar et al. | |
| 2013/0182932 A1 | 7/2013 | Chen et al. | |

(Continued)

FOREIGN PATENT DOCUMENTS

| | | | |
|---|---|---|---|
| CN | 101790748 B | 3/2013 | |
| EP | 2030072 B1 | 12/2012 | |
| EP | 3157012 A1 * | 4/2017 | ............... G03H 1/08 |

(Continued)

*Primary Examiner* — Vu Le
*Assistant Examiner* — Jack Peter Kraynak
(74) *Attorney, Agent, or Firm* — McDonnell Boehnen Hulbert & Berghoff LLP

(57) ABSTRACT

Methods of performing a complex Fourier transform of a complex data set corresponding to an image are disclosed. The methods comprise receiving a complex data set and performing a first 1D complex Fourier transform in the complex data set in Cartesian form; converting the complex data set into polar form and compressing the complex data set in polar form; performing a row-column transformation of the complex data set; decompressing the complex data set and converting the complex data set back into Cartesian form; and performing a second 1D Fourier transform in the complex data set in Cartesian form, wherein the second 1D complex Fourier transform is orthogonal to the first 1D complex Fourier transform. Corresponding systems are also disclosed, as are application to the iterative computation of computer-generated holograms.

20 Claims, 12 Drawing Sheets

(56) References Cited

U.S. PATENT DOCUMENTS

2016/0117847 A1    4/2016  Pandev et al.
2017/0299713 A1*  10/2017  Bevier ................... G01S 13/90

FOREIGN PATENT DOCUMENTS

| | | | | |
|---|---|---|---|---|
| EP | 3296886 A1 | | 3/2018 | |
| GB | 2498170 A | | 7/2013 | |
| GB | 2496108 A | | 8/2013 | |
| GB | 2501112 A | | 10/2013 | |
| GB | 2568021 A | * | 5/2019 | .......... G02F 1/1313 |
| TW | 201246161 A | | 11/2012 | |
| TW | 201626476 A | | 7/2016 | |
| WO | 2016/092452 A1 | | 6/2016 | |
| WO | 2019/048867 A1 | | 3/2019 | |

* cited by examiner

IMAGE PROCESSING SYSTEMS AND METHODS

CROSS-REFERENCE TO RELATED APPLICATIONS

The present application is a non-provisional patent application claiming priority to United Kingdom Patent Application No. GB 2013203.1, filed Aug. 24, 2020, the contents of which are hereby incorporated by reference in their entirety.

FIELD OF THE DISCLOSURE

The present disclosure relates to image processing. More particularly, the present disclosure relates to efficient implementations of two-dimensional Fourier transforms of complex image data, as well as to data compression of complex valued image data. Specifically, although not exclusively, the disclosure relates to the processing of image data for holographic display.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

SUMMARY

Aspects of the present disclosure are defined in the appended independent claims.

In a first aspect, there is provided an image processing system arranged to perform a Fourier transform of a first complex data set representing (i.e. corresponding to) a two-dimensional image. The first complex data set comprises a two-dimensional array of complex values in Cartesian form. The values of the two-dimensional array represent (i.e. correspond to) pixels of the two-dimensional image. For example, each value in the two-dimensional array of the complex data set comprises a pixel value. Each value is represented in a first number format with a first number of bits. The two-dimensional array defines first linear arrays, for example rows, of values representing pixels along one dimension and second linear arrays, for example columns, of values representing pixels along the other dimension. Of course, it will be understood that reference to rows or columns as used herein is made for convenience and the assignment between linear arrays and rows/columns, and between rows/columns and respective dimensions of the image is arbitrary and the terms rows and columns can be used interchangeably. Furthermore, a row of the array may correspond to a column of pixels of the image and a column of the array may correspond to a row of pixels of the image, or vice versa.

The image processing system comprises: one or more processors, arranged to perform the Fourier transform of the first complex data set corresponding to the image, and tangible, non-transitory, computer-readable media storing instructions executable by the one or more processors. The instructions, when executed, cause the image processing system to perform functions comprising: performing a 1D Fourier transform of each first linear array of values of the first complex data set in Cartesian form; converting each value of each Fourier transformed first linear array to polar form; converting each value in polar form to a second number format with a second number of bits less than the first number of bits; storing the values in the second number format in a memory first linear array by first linear array; reading out the values from the memory second linear array by second linear array; converting each value read from the memory back to the first number format; converting each value converted back to the first number format back to Cartesian form; and performing a 1D Fourier transform of each second linear array of values converted back to Cartesian form, wherein the Fourier transformed second linear arrays of values are used to form a second complex data set, and forming image data using the second complex data set. The system may further comprise a controller arranged to output the image data for display.

Advantageously, by reducing the bits used to store each complex data value in the data set for the row-column transformation, a specific memory bottle neck is mitigated. While most functions of the system can process a stream of data linear array by linear array, the row-column (or transpose) function must receive and store all first linear arrays before being able to read out the second linear arrays. Reducing the bits per value at this stage is thus particularly effective as it reduces the length of time that the data is held up at the row-column transformation memory bottle neck, thereby increasing processing speed. In addition, the memory capacity needed for the row-column transformation is reduced. Furthermore, the disclosure provides an efficient way of reducing the bits per value that mitigates quality losses by operating on polar coordinates to reduce the bits per value, thereby ensuring image quality is maintained. This is because in polar representation the phase information is better preserved when represented in a reduced number of bits. Hence this way of converting the data is particularly well adapted for algorithms where significant information—perhaps the most important image-forming information—is actually encoded in the phase, such as algorithms for generating holograms of images or similar image processing algorithms. By contrast, compression in Cartesian coordinates leads to larger errors in the phase component—particularly when a large number of low magnitude values are formed—as in the case of the Fourier transformed based process disclosed herein. In some respects, it may be said that the improved method disclosed herein prioritizes the phase information and is therefore advantageous in cases, such as fully complex holography, in which it is found that errors in the phase component are more damaging than errors in the amplitude component. Once the values have been stored (buffered) in readiness for the row-column transformation, they can then be converted back into more costly number formats that are more adapted for the Fourier transform computations to avoid propagation of rounding errors. Further, the speed to the row-column transformation is increased, for example, by writing smaller data words for each value (for example 16 bits for each of phase and magnitude), two values can be written for each 64 bit word in a 64 bit computational architecture.

The image processing system of the first aspect receives and processes image data for display. For example, the system may receive image data comprising a two-dimensional array of complex values in Cartesian form representing pixels of a two-dimensional input image from an image source. The system may process the input image data to form image data comprising a two-dimensional array of complex values in Cartesian form representing pixels of a two-dimensional output image for display. It will be appreciated that the array of complex values of the output image data are displayed on respective pixels of a display device. The image processing comprises performing a two-dimensional Fourier transform of the input image data, commonly used in image processing techniques. Such image processing techniques include methods and algorithms to form a computer-generated hologram corresponding to an input image, as described herein. Thus, in some implementations, a display device encoded with the output image data displays an output image corresponding to the processed input image. In other implementations, a display device encoded with the output image data displays a hologram corresponding to the input image. Thus, the term "image data" used herein comprises data that, when encoded on pixels of a display device, causes the display device to display an image or a hologram of an image.

In some embodiments, the image processing system of the first aspect may be used as a building block to implement image processing for the computational generation of holograms for display and holographic reconstruction as disclosed herein. For example, such a system may comprise two data processing systems as described, functionally chained together with an intervening data processor that manipulates the magnitude of the complex values of the output of the first data processing system to produce an input for the second data processing system. In some embodiments the second data processing system may be connected back to the first data processing system in a similar or same manner to implement an iterative computation. It will be appreciated that the first and second data processing systems (and hence respective functions) are in fact the same one, so that the output of the data processing system is manipulated as described and then fed back to the input. Where the first and second data processing systems are not one and the same, they may still share one or more of the functions.

Further, the function within each data processing system may correspond to individual instances (i.e. two Fourier transform functions, two conversion functions, etc) or one or more of the functions may in fact be a single one (i.e. the first Fourier transform function being also the second one, the first conversion function being also the second one, etc) and the values routed accordingly between the functions. Equally, each data processing system may use the same or different high bit number formats and the same or different low bit number formats.

It will be appreciated that a wide variety of standard or custom number formats may be used. For example, the complex values may be stored as two DOUBLE floating point numbers (128 bits), one for each of the complex/imaginary part or phase/angle, depending on the form of complex number and similarly two SINGLE floating point numbers (64 bit) or two HALF floating point numbers (32 bits). Custom number formats, for example assuming a fixed decimal point and fixed/no exponent are equally possibly, for example encoding each complex value in 128, 64 or 32 bits in this way. In such custom number formats, the number of bits allocated to the real/imaginary part may be the same for each of real and imaginary part or different number of bits may be assigned to each component of the complex value. Regardless, the present disclosure encompasses the conversion of a floating point (or other decimal or binary number) from a format with a first number of bits to a format with a second number of bits, for example by one or more of scaling, re-assignment of bit values to decimal value, rounding, dropping and adding of least significant bits, etc.

In some embodiments, converting the values in polar form to the second number format may comprise converting each magnitude value from x1 bit to y1 bit, where x1>y1 and each phase value from x2 bit to y2 bit, where x2>y2. The bit numbers x1 and x2 may be the same and/or y1 and y2 may be the same, say x and y. In a specific example, x1=x2=32 bits (64 bits per data value) and y1=y2=8 bits (16 bits per data value). Converting each value in polar form to the second number format may comprise multiplying each magnitude by a scaling factor and/or may comprise setting any magnitude values above a maximum permitted value to the maximum permitted value. For example, this thresholding may be done subsequent to the scaling. The thresholding may comprise dropping least significant bits from the magnitude value and/or rounding. The maximum permitted value may be the maximum magnitude value that can be represented with y1 bits. In some embodiments, converting each value in polar form to the second number format comprises quantising the phase values of the value in polar form with a lower number of levels than in the first number format. For example, this may involve dropping least significant bits from the phase value or rounding. Of course, other techniques for reducing the number of bits required to store each complex value may equally be used.

In some embodiments, converting each value in Cartesian form back to the first number format comprises converting each magnitude value from y1 bit back to x1 bit and each phase value from y2 bit back to x2 bit. For example, this may involve multiplying each magnitude value by the inverse of the scaling factor.

In some embodiments, the memory of the row-column conversion function is static random access memory (SRAM), which advantageously has faster access times than dynamic random access memory (DRAM). Reducing the memory required by reducing the number of bits per complex value facilitates the use of SRAM (partially) off-setting the higher cost per bit of SRAM.

In some embodiments, the first Fourier transform function is configured to process one first linear array while the first conversion function processes another first linear array, wherein the second Fourier transform function is configured to process one second linear array while the second conversion function processes another second linear array, or both. For example, the first and, optionally the second, Fourier transform function may receive the complex values as a stream of values. The values may be processed on a serial bus.

In some embodiments, the system comprises an output interface arranged to output the image data for display. For example, the controller may comprise an output interface of the system arranged to output a hologram representative of an input image to a holographic display device as described herein. The hologram may be a phase-only hologram or a fully complex hologram comprising a phase and an amplitude component. An input interface may be arranged to receive a sequence of images from an image source (e.g. video camera) in real-time and the output interface may be arranged to output a sequence of holograms representative of the respective images (or respective processed images) in real-time. As a result, images are processed as they are received, in real time, that is at low latency, for example enabling the production of holographic video frames from image video frames online at typical video frame rates, for example 24 fps. In some embodiments, the holographic display device comprises a spatial light modulator arranged to display the hologram and a light source arranged to illuminate the spatial light modulator to form a holographic reconstruction. In some embodiments, the image processing system and the holographic display may comprise a single integrated apparatus.

In a second aspect, a method of image processing for performing a complex Fourier transform of a first complex data set corresponding to an image is disclosed. The first complex data set comprises a two-dimensional array of complex values in Cartesian form each represented in a first number format with a first number of bits. The values of the two-dimensional array represent (i.e. correspond to) pixels of the two-dimensional image. The two-dimensional array defines first linear arrays of values representing pixels along one dimension and second linear arrays of values representing pixels along the other dimension, for example rows and columns as discussed above.

The method comprises the following steps: performing a 1D Fourier transform of each first linear array in the first complex data set; converting each value of each Fourier transformed first linear array to polar form; converting each value in polar form to a second number format with a second number of bits less than the first number of bits; storing the values in the second number format in a memory first linear array by first linear array; reading out the values from the memory second linear array by second linear array; converting each value read from the memory back to the first number format; converting each value converted back to the first number format back to Cartesian form; and performing a 1D Fourier transform of each second linear array of values converted back to Cartesian. The method further comprises using the Fourier transformed second linear arrays of values to form image data for display. For example, the Fourier transformed second linear arrays of values may be used to form a second complex data set, and the method may further comprise forming image data using the second complex data set.

Similarly, as described above for the system, the Fourier transformed second linear arrays may be used as first linear arrays in the first Fourier transform step, subsequent to manipulation of magnitudes as described above (and in more detail below), in algorithms for generating holograms of images or similar image processing techniques. As before, the number formats may be the same or different between the two passes and steps may loop back the first Fourier transform step repeatedly for an iterative process. Further, all passes may use the same memory for the row-column transformation, or, for example, separate such memories may be used for odd and even numbered passes.

Of course, features of embodiments of the first aspect described above are equally applicable to the second aspect and the further aspects disclosed below.

In a third aspect, an image processing system is arranged to process a complex data set corresponding to an image. The first complex data set comprises complex values in Cartesian form each represented in a first number format with a first number of bits. The complex values represent (i.e. correspond to) pixels of the image. The system comprises a conversion function arranged to receive the complex data set, convert each value to polar form and convert each value in polar form to a second number format with a second number of bits less than the first number of bits.

In some embodiments, the complex values of the data set are arranged in a two-dimensional array that defines first linear arrays of values along one dimension and second linear arrays of values along the other dimension. In some embodiments, the data processing system further comprises a row-column transformation function arranged to receive the complex data set processed by the first conversion function, store the values in the second number format in a memory first linear array by first linear array and to read out the values from the memory second linear array by second linear array.

In some embodiments, the system comprises a Fourier transform function arranged to receive the complex data set first linear array by first linear array and perform a 1D Fourier transform of each first linear array and the conversion function is arranged to receive the complex data set from the Fourier transform function, first linear array by first linear array, with each linear array Fourier transformed by the Fourier transform function.

In a fourth aspect, a method of image processing of a first complex data set corresponding to an image is disclosed. The complex data set comprises complex values in Cartesian form each represented in a first number format with a first number of bits. The complex values represent (i.e. correspond to) pixels of the image. The method comprises converting each value to polar form and converting each value in polar form to a second number format with a second number of bits less than the first number of bits.

In some embodiments, the complex values of the data set are arranged in a two-dimensional array that defines first linear arrays of values representing pixels along one dimension and second linear arrays of values representing pixels along the other dimension. In some embodiments, the method comprises storing the values in the second number format in a memory first linear array by first linear array and reading out the values from the memory second linear array by second linear array.

In a fifth aspect, an image processing system is arranged to perform a complex Fourier transform of a complex data set corresponding to an image. The system comprises:
  a first Fourier transform function arranged to receive a
    complex data set and perform a first 1D complex
    Fourier transform of the complex data set in Cartesian
    form;

a first data conversion function arranged to receive the complex data set processed by the first Fourier transform function, convert the complex data set into polar form and compress the complex data set in polar form;

a row-column transformation function arranged to receive the complex data set processed by the first data conversion function and perform a row-column transformation of the complex data set;

a second data conversion function arranged to receive the complex data set processed by the row-column transformation function, decompress the complex data set and convert the complex data set back into Cartesian form; and a second Fourier transform function arranged to receive the complex data set processed by the second data conversion function and perform a second 1D complex Fourier transform of the complex data in Cartesian form, wherein the second 1D complex Fourier transform is orthogonal to the first 1D complex Fourier transform. The system is further arranged to use the data values of the complex data set processed by the second Fourier transform function to form image data for display.

In a sixth aspect, a method of image processing for performing a complex Fourier transform of a complex data set corresponding to an image is disclosed. The method comprises the following steps in order:

receiving a complex data set and performing a first 1D complex Fourier transform of the complex data set in Cartesian form;

converting the complex data set into polar form and compressing the complex data set in polar form;

performing a row-column transformation of the complex data set;

decompressing the complex data set and converting the complex data set back into Cartesian form;

performing a second 1D Fourier transform of the complex data set in Cartesian form, wherein the second 1D complex Fourier transform is orthogonal to the first 1D complex Fourier transform. The method further comprises using the Fourier transformed complex data set to form image data for display.

Compression of image data may be performed as described above (reducing the number of bits for each pixel value individually by conversion to a different number format) or in any other suitable fashion.

In a seventh aspect, there is disclosed a system for compressing a complex data set representing an image, the system comprising a data conversion function arranged to receive the complex data set, convert the complex data set into polar form and compress the complex data set in polar form.

In an eighth aspect, there is provided a method compressing a complex data set representing an image, the method comprising converting the complex data set into polar form and compressing the complex data set in polar form.

The term "hologram" is used to refer to the recording which contains amplitude and/or phase information about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

It has been found that a holographic reconstruction of acceptable quality can be formed from a "hologram" containing only phase information related to the original object. Such a holographic recording may be referred to as a phase-only hologram. However, any reference to a phase-only hologram is by way of example only. The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different aspects, embodiments and groups of aspects and embodiments may be disclosed separately in the disclosure, any feature of any embodiment or group of embodiments may be combined with any other feature or combination of features of any embodiment or group of embodiments. That is, all possible combinations and permutations of features disclosed in the present disclosure are envisaged and hereby disclosed.

Although different aspects, embodiments and groups of aspects and embodiments may be disclosed separately in the disclosure, any feature of any embodiment or group of embodiments may be combined with any other feature or combination of features of any embodiment or group of embodiments. That is, all possible combinations and permutations of features disclosed in the present disclosure are envisaged and hereby disclosed

BRIEF DESCRIPTION OF THE FIGURES

Specific embodiments are described by way of example only with reference to the following figures.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
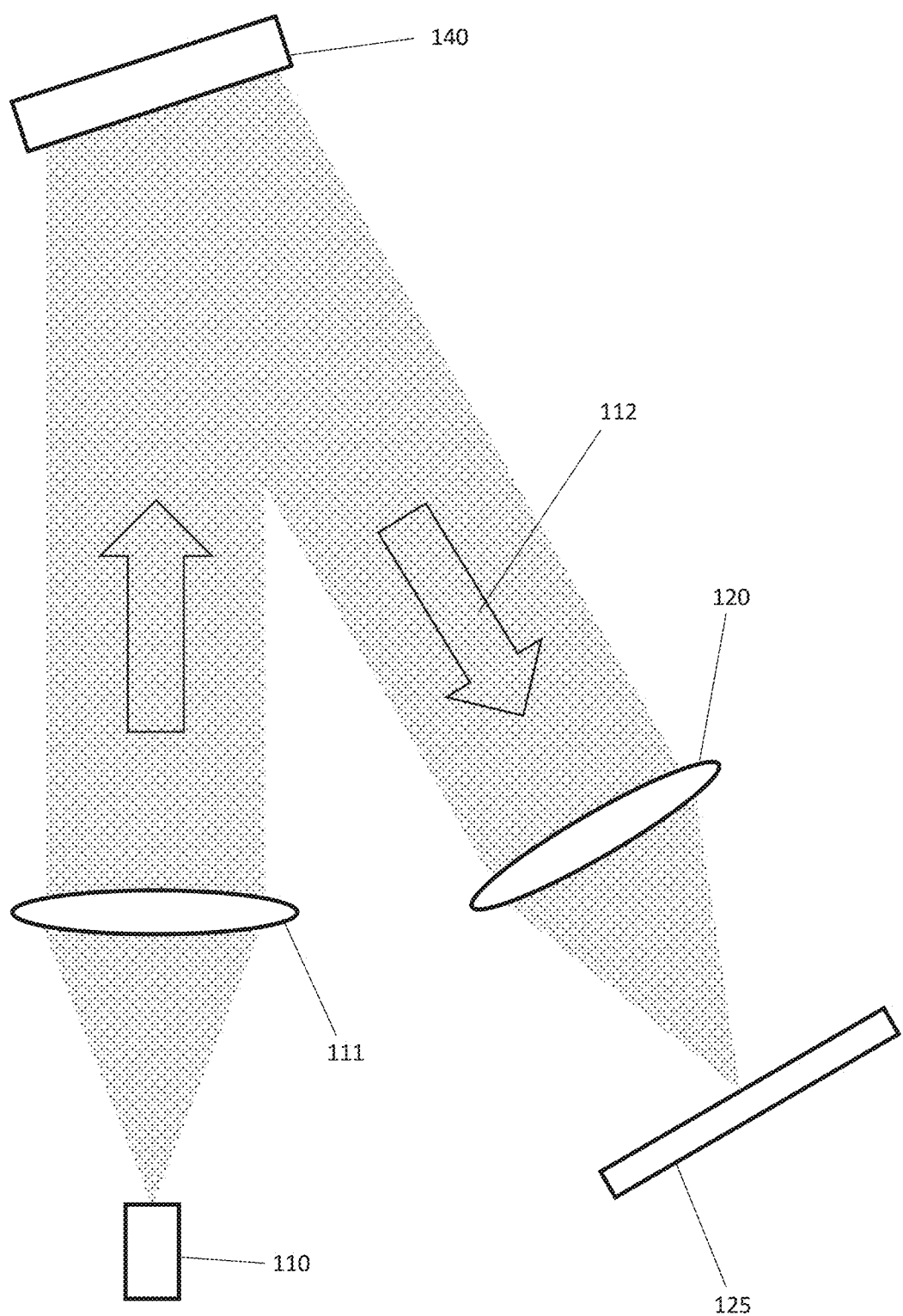
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens (either a physical lens or a software lens implemented by a corresponding phase delay distribution displayed on an SLM). The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, IA(x, y) and IB(x, y), in the planes A and B respectively, are known and IA(x, y) and IB(x, y) are related by a single Fourier transform. With the given intensity cross-sections, an approximation to the phase distribution in the planes A and B, IA(x, y) and IB(x, y) respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of IA(x, y) and IB(x, y), between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in United Kingdom Pat. No. 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information P [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information I[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component, known as Cartesian form, or (ii) a magnitude component and a phase component, known as polar form. In some embodiments, the two components of the complex data are processed differently at various stages of the algorithm.

Figure 2A:
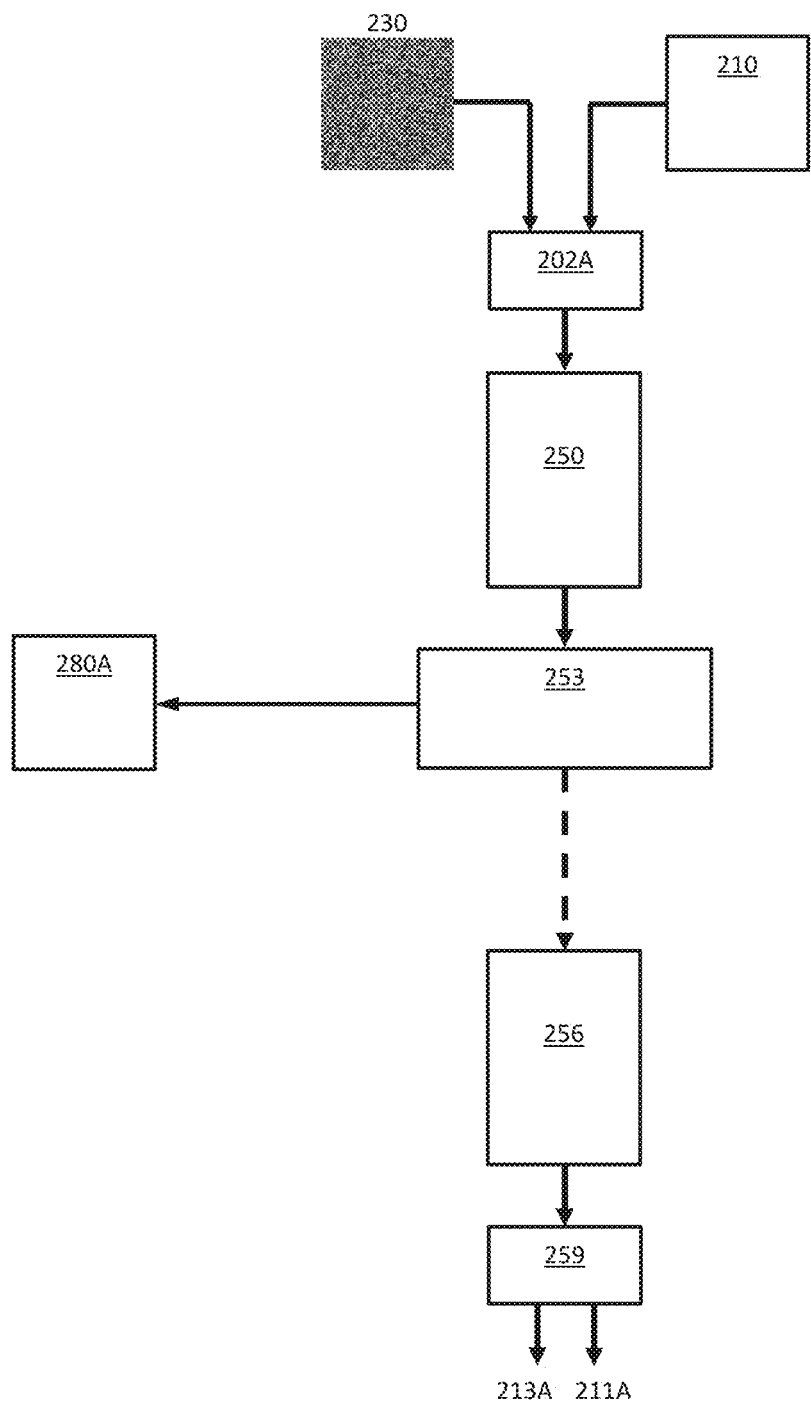
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantizes each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
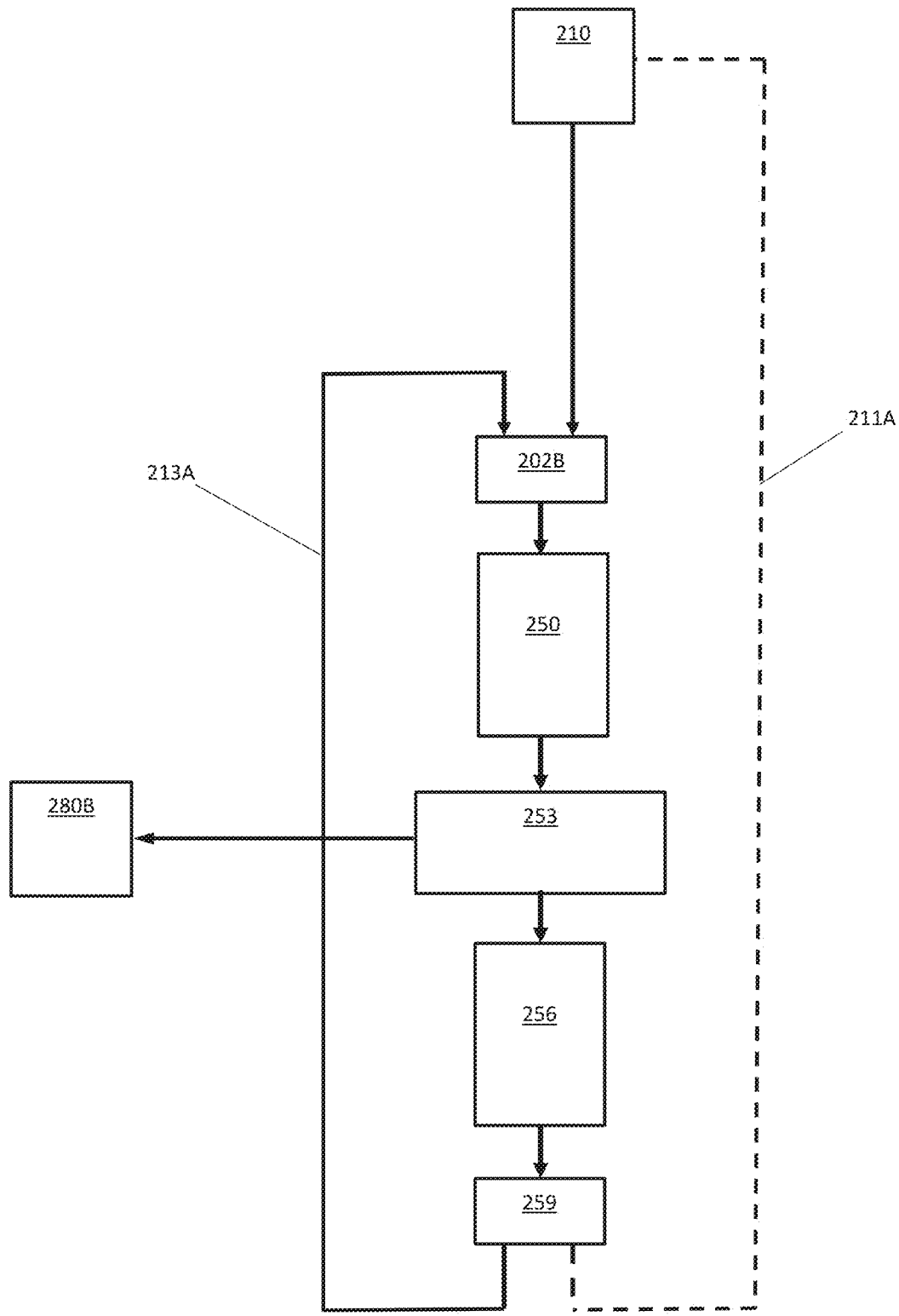
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
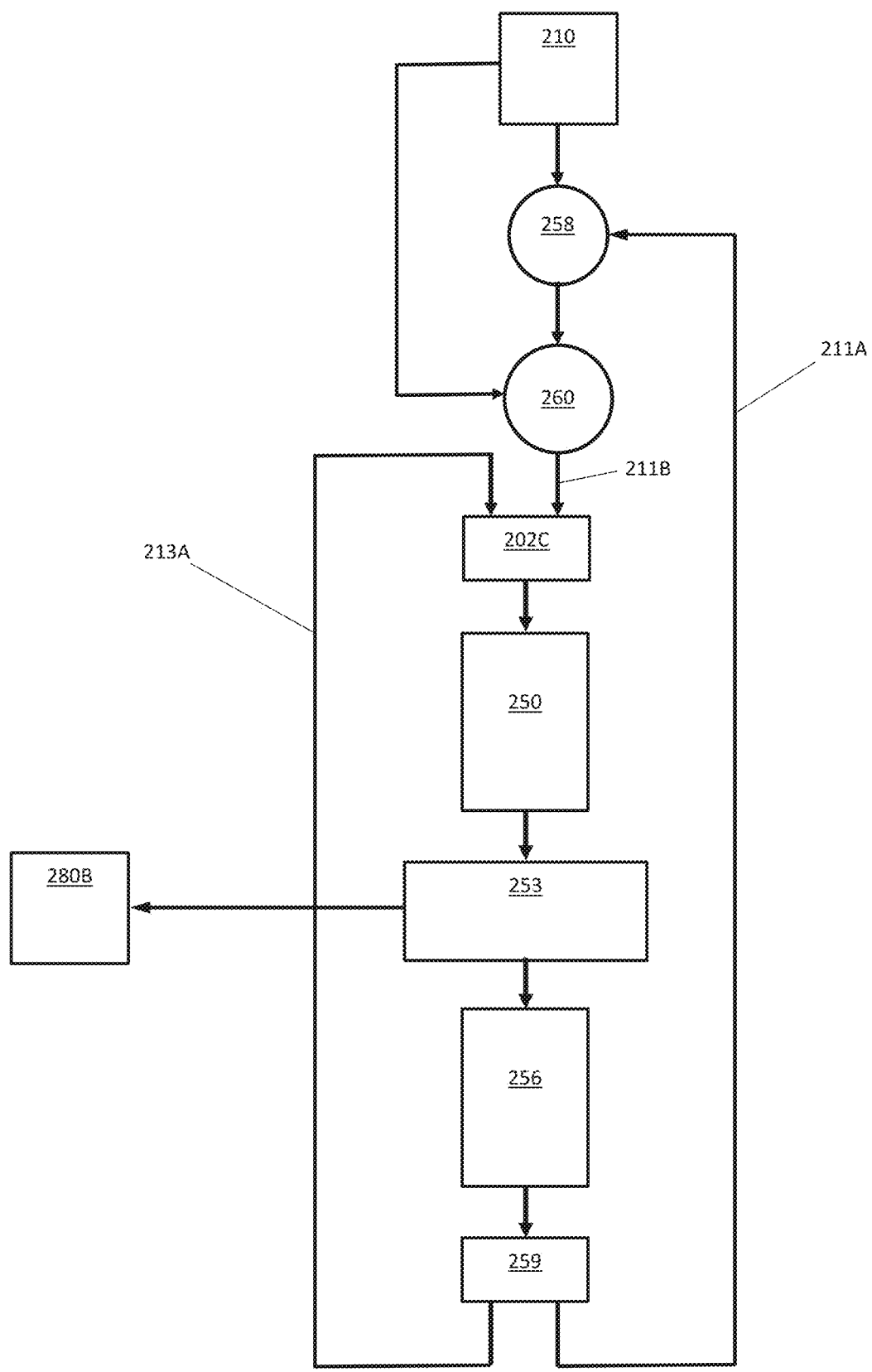
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;

R[x, y] is the complex data set output by the third processing block 256;
T[x, y] is the input or target image;
∠ is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
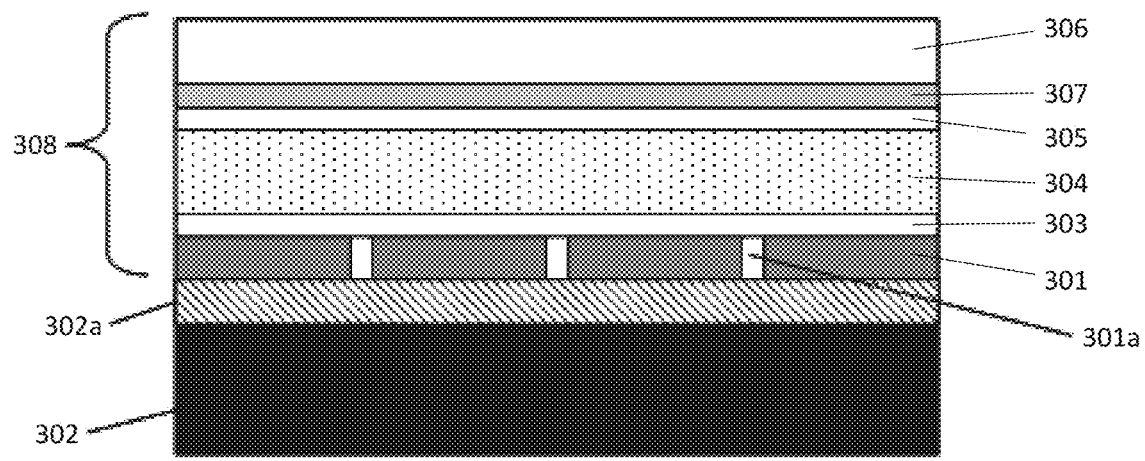
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the liquid crystal layer 304 and a planar transparent layer 306, e.g. of glass, is disposed on the second alignment layer 305. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Implementation of 2D Fourier Transform

Figure 4A:
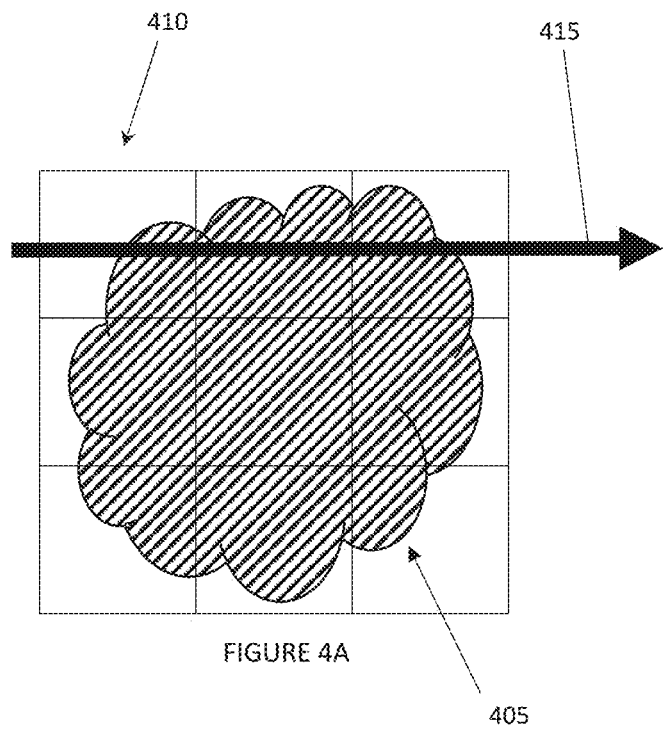
FIGS. 4A-4D illustrate a 2D Fourier transform.
Figure 4B:
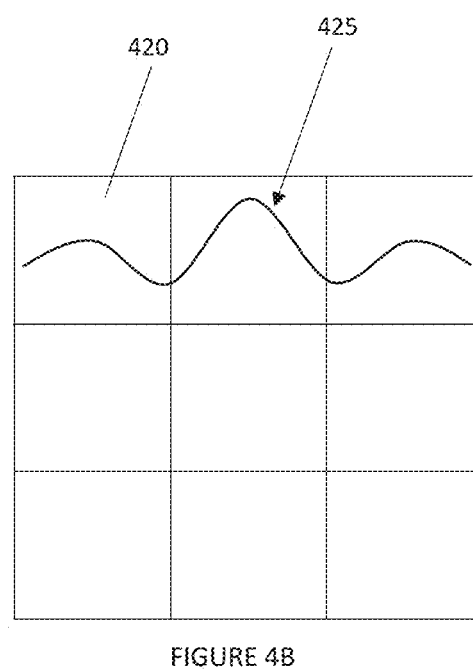

With reference to FIGS. 4A-D, a two-dimensional (2D) Fourier transform of image data representing a 2D image can be decomposed into two one-dimensional (1D) Fourier transforms, one along each dimension. FIG. 4A illustrates a 2D array 410 of complex data values representing an image 405, for example with magnitudes corresponding to pixel values and random phase, as described above. A Fourier transform 425 is computed for each row of the array 410, as indicated by the arrow 415, to calculate a corresponding row 420 of a row Fourier transformed array 430 (see FIGS. 4B and 4C). It may be said that the array 430 is Fourier transformed row by row. The array 430 is then Fourier transformed column by column, as indicated by arrow 435 in FIG. 4C to provide an array 440 of data values representing a 2D Fourier transform 445 of the array 410 representing the image 405 (see FIG. 4D).

Figure 5:
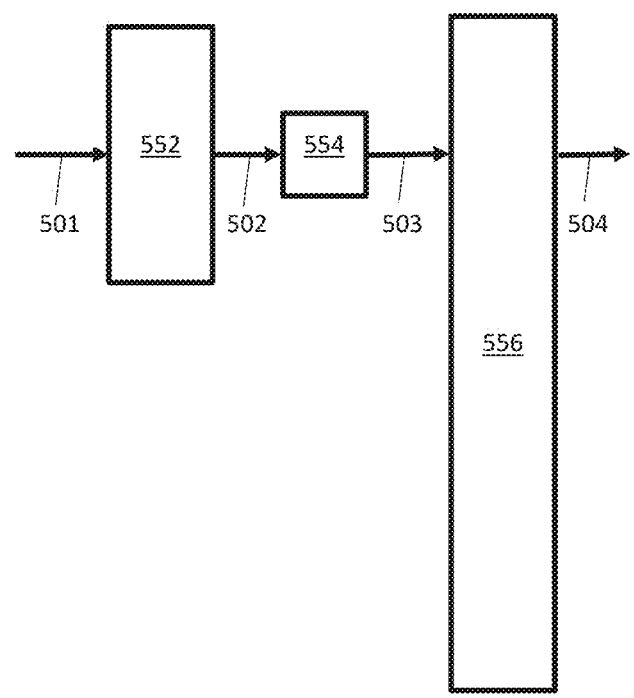
FIG. 5 illustrates an image processing system arranged to Fourier transform and convert image data.

With reference to FIG. 5, an image data processing system, specifically suitable for performing a two dimensional (2D) Fourier transform of a 2D image, comprises a first Fourier transform function 552 arranged to: receive a first data stream 501 representing a first array of first complex data values, wherein each first complex data value is a real value formed of x-bits and an imaginary value formed of x-bits, that is the data values are in Cartesian form; perform a first complex Fourier transform of the first array of first complex data values to form a second array of second complex data values, wherein each second complex data value is a real value formed of x-bits and an imaginary value formed of x-bits; and output a second data stream 502 representing the second array of second complex data values. For example, x=32 bits.

Specifically, the first array is representative of an input image as illustrated by array 410 in FIG. 4A, with the magnitudes of the complex data values corresponding to image intensities (pixel values) in an input image and a random phase being assigned to each data value. For example, these data assignments can be made in polar form and the data values then transformed into Cartesian form. The array can be represented as follows, with complex data values Aij:

$$\begin{bmatrix} A_{11} & A_{12} & A_{13} & \cdots & A_{1n} \\ A_{21} & A_{22} & A_{23} & \cdots & A_{2n} \\ \vdots & \vdots & \vdots & \ddots & \vdots \\ A_{m1} & A_{m2} & A_{m3} & \cdots & A_{mn} \end{bmatrix}$$

The corresponding data stream (first data stream 501) received by the first Fourier transform function 552 can be represented as follows, with the Fourier transform function 552 receiving the data values one row after the other:

$$[A_{11}\, A_{12}\, A_{13} \ldots A_{1n}\, A_{21}\, A_{22}\, A_{23} \ldots A_{2n}\, A_{m1}\, A_{m2}\, A_{m3} \ldots A_{mn}]$$

The Fourier transform function 552 processes the data values one row at a time as follows, with FFT indicating a Fast Fourier Transform, although it will be appreciated that any Fourier transform implementation can be used:

$$[A_{11}\ A_{12}\ A_{13}\ \ldots\ A_{1n}] \xrightarrow{FFT} [A'_{11}\ A'_{12}\ A'_{13}\ \ldots\ A'_{1n}]$$

$$[A_{21}\ A_{22}\ A_{23}\ \ldots\ A_{2n}] \xrightarrow{FFT} [A'_{21}\ A'_{22}\ A'_{23}\ \ldots\ A'_{2n}]$$

$$[A_{m1}\ A_{m2}\ A_{m3}\ \ldots\ A_{mn}] \xrightarrow{FFT} [A'_{m1}\ A'_{m2}\ A'_{m3}\ \ldots\ A'_{mn}]$$

Figure 4C:
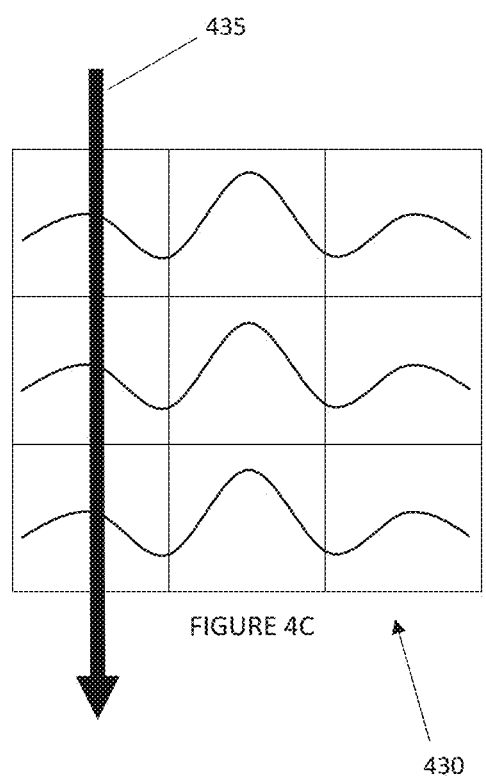
Figure 4D:
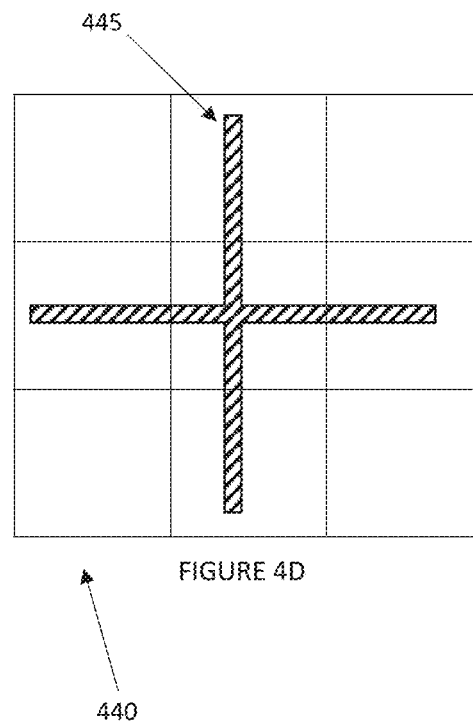

The Fourier transform function 552 outputs each transformed row one after the other and thereby creates another data stream (second data stream 502), which corresponds to the Fourier transform of one of the dimensions of the array, for example the rows of the array as illustrated by the array 430 in FIG. 4C:

$$[A'_{11}\, A'_{12}\, A'_{13} \ldots A'_{1n}\, A'_{21}\, A'_{22}\, A'_{23} \ldots A'_{2n}\, A'_{m1}\, A'_{m2}\, A'_{m3} \ldots A'_{mn}]$$

A first data conversion function 554 is arranged to: receive the second data stream 502; convert each second complex data value into polar form with a magnitude value formed of x-bits and a phase value formed of x-bits; compress each magnitude value and each phase value to form a third array of third complex data values, for example with a magnitude value formed of y-bits and a phase value formed of y-bits, with y<x; and output a third data stream 503 representing a third array of third complex data values. For example, x=32 bits and y=8 bits.

The combined operation of conversion and compression can be represented as follows:

$$\begin{bmatrix} A'_{11} & A'_{12} & A'_{13} & \ldots & A'_{1n} \\ A'_{21} & A'_{22} & A'_{23} & \ldots & A'_{2n} \\ \vdots & \vdots & \vdots & \ddots & \vdots \\ A'_{m1} & A'_{m2} & A'_{m3} & \ldots & A'_{mn} \end{bmatrix} \Rightarrow \begin{bmatrix} a'_{11} & a'_{12} & a'_{13} & \ldots & a'_{1n} \\ a'_{21} & a'_{22} & a'_{23} & \ldots & a'_{2n} \\ \vdots & \vdots & \vdots & \ddots & \vdots \\ a'_{m1} & a'_{m2} & a'_{m3} & \ldots & a'_{mn} \end{bmatrix}$$

The third data stream 503 can be represented as follows:

$$[a'_{11}\, a'_{12}\, a'_{13} \ldots a'_{1n}\, a'_{21}\, a'_{22}\, a'_{23} \ldots a'_{2n}\, a'_{m1}\, a'_{m2}\, a'_{m3} \ldots a'_{mn}]$$

It will be appreciated that the compression of the data values representing an image may comprise (or even consist of) converting each data value in polar form to a number format using less bits, for example converting each of the magnitude and phase separately to a number format that uses less bits. For example, the original number format may use one DOUBLE (64 bit) or SINGLE (32 bit) floating point number for each of the phase and magnitude and the function 554 may convert each number to a HALF (16 bit) or QUARTER (8 bit) floating point number in any way, for example by dropping the required number of least significant bits from the decimal part of the floating point number. The number formats (original and compressed) are of course not so limited and the numbers may be represented in other formats, for example binary or integer formats. For example, in one possible format, $2\pi$ of phase corresponds to the largest representable binary/integer number for the phase part with values between and $2\pi$ evenly spaced over the available levels between 0 and that number and the magnitude is similarly represented with a threshold magnitude (the largest representable magnitude) corresponding to the largest representable numeric value and intermediate values between zero and that magnitude evenly spaced over the available levels between. In a specific example, the initial number format represents each of the phase and magnitude in 1024 levels (32 bits each, 64 bits total) and the compressed number format represents each of the phase and magnitude in 64 levels (8 bits each, 16 bits total).

In either case, compressing the phase may comprise redistributing the values to the available levels between 0 and $2\pi$ in the lower bit representation. For the magnitude values (which are not necessarily limited to a fixed interval), the numeric values may be limited to a fixed interval based on knowledge of the magnitudes that are likely to occur. For example, the magnitude values may be scaled to a lower numeric value so that more fit within the available range and assigned to the corresponding available representation level with magnitude values still exceeding the maximum representable number being set (thresholded) to that number. The scaling factor used to scale down (multiply) the numeric values may be set based on knowledge of typical data set as a trade-off so that no more than an acceptable number of magnitudes are likely to get thresholded while the available levels represent an acceptable precision (the levels being not more spaced apart numerically/coarser than is desired).

It will further be appreciated that while conversion and compression of image data are described as separate operations, this is done for the purpose of convenience of describing the first data conversion function 554 and covers those implementations in which there are separate operations and those in which there are not. For example, each data value may be read by the processor into a working register (of other internal representation of the processor) to convert the data value into polar form and written out to a memory available for further processing in the lower bit number format in what can be described from outside the processor as a single operation (although various machine level operations are of course occurring inside the processor to implement this).

A row-column transformation function 556 is arranged to: receive the third data stream 503; write the third array of third complex data values to a memory; and read out a fourth data stream 504 representing a fourth array of fourth complex data values, wherein the fourth array of fourth complex data values is a row-column transformation or transpose of the third array of third complex data values.

Specifically, the transformation function 556 receives the third data stream 503 as it is produced by the first data conversion function 554 row by row and writes the data values to the memory row by row. Once all of the third data stream 503, that is all rows of the array, has been written to the memory, the data values are read out from the memory column by column. The resulting data stream (fourth data stream 504) can be represented as follows:

$$[a'_{11}\, a'_{21}\, a'_{31} \ldots a'_{m1}\, a'_{12}\, a'_{22}\, a'_{32} \ldots a'_{m2}\, a'_{1n}\, a'_{2n}\, a'_{3n} \ldots a'_{mn}]$$

The corresponding (row Fourier transformed, compressed and transposed) array can be represented as follows:

$$\begin{bmatrix} a'_{11} & a'_{21} & \ldots & a'_{m1} \\ a'_{12} & a'_{22} & \ldots & a'_{m2} \\ a'_{13} & a'_{23} & \ldots & a'_{m3} \\ \vdots & \vdots & \ddots & \vdots \\ a'_{1n} & a'_{2n} & \ldots & a'_{mn} \end{bmatrix}$$

The above array may form image data representative of an output image or may be used as input image data for further processing iterations as described below.

Thus, in some embodiments, an image data processing system providing a row by row Fourier transformed array in transpose form ready for column by column processing is provided, whereby it will of course be appreciated that rows and columns are referred to herein as examples of respective linear arrays in respective dimensions and that, correspondingly, processing may start column by column and the data processing system provide the array row by row. In other words, the term "row" is used merely to denote a linear array spanning one dimension (row or column, horizontal or vertical, etc) and the term "column" is merely used to denote a linear array spanning the other dimension in the 2D array.

Figure 6:
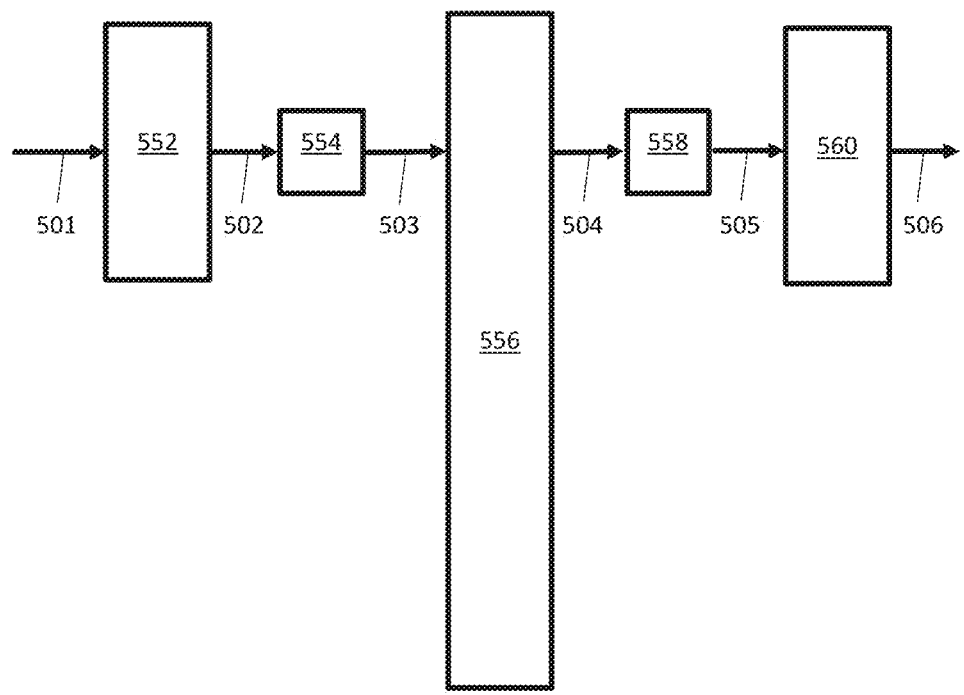
FIG. 6 illustrates an image processing system arranged to implement a 2D Fourier transform.

With reference to FIG. 6, a second data conversion function 558 is arranged to: receive the fourth data stream 504; decompress each fourth complex data value; convert each fourth complex data value into a fifth complex data value comprising a real value and an imaginary value, that is into Cartesian form; and output a fifth data stream 505 representing a fifth array of the fifth complex data values.

The operation of the second data conversion function 558 can be conceptualised as follows:

$$\begin{bmatrix} a'_{11} & a'_{21} & \ldots & a'_{m1} \\ a'_{12} & a'_{22} & \ldots & a'_{m2} \\ a'_{13} & a'_{23} & \ldots & a'_{m3} \\ \vdots & \vdots & \ddots & \vdots \\ a'_{1n} & a'_{2n} & \ldots & a'_{mn} \end{bmatrix} \Rightarrow \begin{bmatrix} A'_{11} & A'_{21} & \ldots & A'_{m1} \\ A'_{12} & A'_{22} & \ldots & A'_{m2} \\ A'_{13} & A'_{23} & \ldots & A'_{m3} \\ \vdots & \vdots & \ddots & \vdots \\ A'_{1n} & A'_{2n} & \ldots & A'_{mn} \end{bmatrix}$$

Specifically, decompression of the image data may comprise the inverse operation of the compression of image data described above, for example re-quantising the phase values into the larger number of levels available (e.g. padding with extra zeros and adding empty levels between the levels of the third/fourth data stream 503, 504) and scaling the magnitude values with the inverse of the scaling factor and re-quantising, or converting back to, say, DOUBLE format, as the case may be.

It will appreciate that the row-column transformation function may be implemented merely as a memory to receive the third data stream, and have it written to the memory in sequence by the first data conversion function 554, in some implementations with a function (alternatively implemented in the first data conversion function 554) to signal to the second data conversion function 558 that all of the data stream 503 has been written. In such implementations this signal then triggers the second data conversion function 558 to read from the memory every nth data value starting from all, that is (ignoring any offset and specific addressing scheme) to read sequentially the memory addresses 1+(k−1)·n with k={1; 2; 3; 4; . . . ; m·n}. Of course, in other embodiments, such an addressing/read out scheme is implemented by the row-column transformation function.

A second Fourier transform function 560 is arranged to: receive the fifth data stream 505; perform a second 1D complex Fourier transform of the fifth array of fifth complex data values to form a sixth array of sixth complex data values, wherein each sixth complex data value is a real value formed of x-bits and an imaginary value formed of x-bits; and output a sixth data stream 506 representing the sixth array of sixth complex data values, wherein the second 1D complex Fourier transform is orthogonal to the first 1D complex Fourier transform, that is, in terms of rows and columns, transforms columns rather than rows.

The operation of the second Fourier transform function 560 can be represented as follows:

$$[A'_{11} \ A'_{21} \ \ldots \ A'_{m1}] \xRightarrow{FFT} [A''_{11} \ A''_{21} \ \ldots \ A''_{m1}]$$
$$[A'_{12} \ A'_{22} \ \ldots \ A'_{m2}] \xRightarrow{FFT} [A''_{12} \ A''_{22} \ \ldots \ A''_{m2}]$$
$$[A'_{13} \ A'_{23} \ \ldots \ A'_{m3}] \xRightarrow{FFT} [A''_{13} \ A''_{23} \ \ldots \ A''_{m3}]$$
$$[A'_{1n} \ A'_{2n} \ \ldots \ A'_{mn}] \xRightarrow{FFT} [A''_{1n} \ A''_{2n} \ \ldots \ A''_{mn}]$$

Specifically, the second Fourier transform function 560 receives the data values in the fifth data stream 505 column by column, transforms one column at a time and outputs the sixth data stream 506 column by column.

The sixth array of data values is the transpose of the 2D Fourier transform of the first array (e.g the input image) and can be represented as follows:

$$\begin{bmatrix} A''_{11} & A''_{21} & \ldots & A''_{m1} \\ A''_{12} & A''_{22} & \ldots & A''_{m2} \\ A''_{13} & A''_{23} & \ldots & A''_{m3} \\ \vdots & \vdots & \ddots & \vdots \\ A''_{1n} & A''_{2n} & \ldots & A''_{mn} \end{bmatrix}$$

The corresponding sixth data stream can be represented as follows:

$$[A''_{11} \ A''_{21} \ldots A''_{m1} \ A''_{12} \ A''_{22} \ldots A''_{m2} \ A''_{1n} \ A''_{2n} \ldots A''_{mn}]$$

Thus, in some embodiments, an image data processing system providing a 2D Fourier transform decomposed into a row by row and a column by column Fourier transform of a 2D array is provided. Since the first array comprises image data representative of an input image as described above and illustrated in FIG. 4A, the sixth data stream can be seen as a computer-generated hologram (after one or more iterations described above in general and specifically with reference to the data processing system below). Specifically, the phase values of each of the complex data values in isolation can be seen as a computer-generated phase-only hologram of the input image. Accordingly, the sixth data stream corresponding to a computer-generated hologram can be output for display by a holographic display device for holographic reconstruction as described herein. Thus, in some embodiments, the data processing system forms an image processing system for generating a hologram of an image represented by the 2D array. The values of the two-dimensional sixth array of data values (corresponding to the sixth data stream) represent (i.e. correspond to) pixels of a two-dimensional hologram corresponding to the two-dimensional input image.

Figure 7:
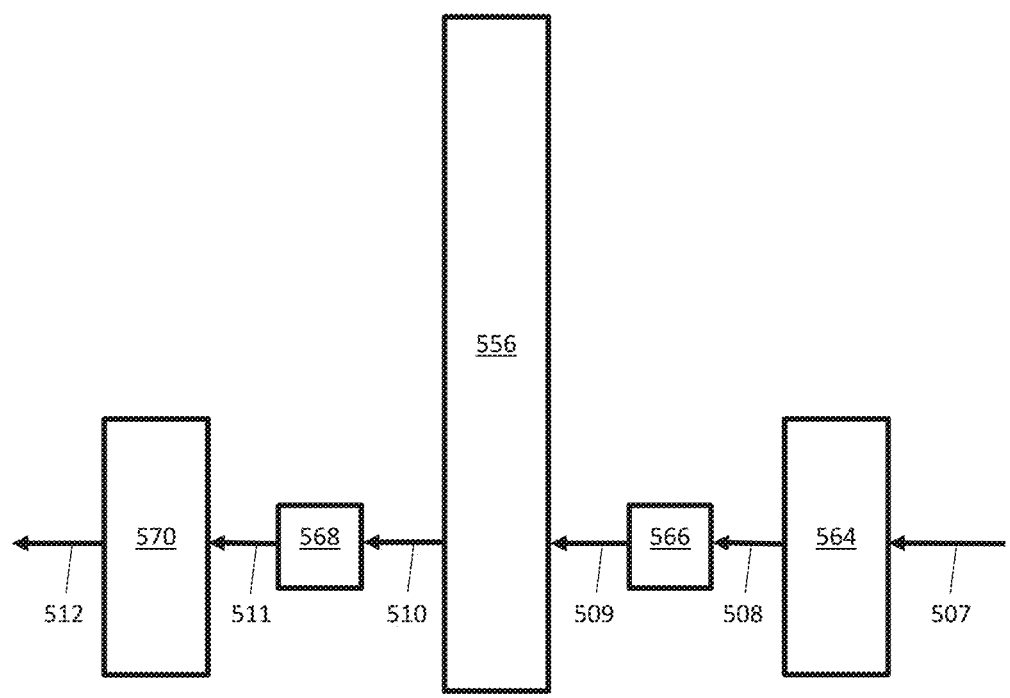
FIG. 7 illustrates an image processing system arranged to implement an inverse 2D Fourier transform.

With reference to FIG. 7, an image data processing system implementing a 2D inverse Fourier transform comprises a first inverse Fourier transform function 564 arranged to: receive a seventh data stream 507; perform a first 1D complex inverse Fourier transform of the seventh array of seventh complex values to form an eighth array of eighth complex data values, wherein each eighth complex data value is a real value formed of x-bits and an imaginary value formed of x-bits; and output an eighth data stream 508 representing the eighth array of eighth complex data values.

As discussed below, the seventh data stream 507 may, for example, be derived from the sixth data stream 506.

A third data conversion function 566 is arranged to: receive the eighth data stream 508; convert each eighth complex data value into a magnitude value formed of x-bits and a phase value formed of x-bits; compress each magnitude value and each phase value to form a ninth array of ninth complex data values; and output a ninth data stream 509 representing a ninth array of ninth complex data values.

The inverse Fourier transform image data processing system, in some embodiments, shares the row-column transformation function 556, e.g. a memory as discussed above, with the data processing systems described above with reference to FIGS. 5 and 6. The row-column transformation function 556 is in this case further arranged to: receive the ninth data stream 509; write the ninth array of ninth complex data values to memory; and read out a tenth data stream 510 representing a tenth array of tenth complex data values, wherein the tenth array of tenth complex data values is a row-column transformation of the ninth array of ninth complex data values. In other embodiments, each data processing system has its own row-column transformation function.

A fourth data conversion function 568 is arranged to: receive the tenth data stream 510; decompress each tenth complex data value; convert each tenth complex data value into an eleventh complex data value comprising a real value and an imaginary value; and output an eleventh data stream 511 representing an eleventh array of the eleventh complex data values.

A second inverse Fourier transform function 570 is arranged to: receive the eleventh data stream 511; perform a second 1D complex inverse Fourier transform of the eleventh array of eleventh complex data values to form a twelfth array of twelfth complex data values, wherein each twelfth complex data value is a real value formed of x-bits and an imaginary value formed of x-bits; and output a twelfth data stream 512 representing the twelfth array of twelfth complex data values, wherein the second 1D complex inverse Fourier transform is orthogonal to the first 1D complex inverse Fourier transform.

The skilled reader will be aware that an inverse Fourier transform is simply a Fourier transform applied to an already Fourier transformed data set. For example, if a Fourier transform transforms an image to a Fourier representation, the inverse transform transforms back to the image representation by Fourier transforming the transformed data set again. Thus, the detailed description above of the functions 552, 554, 558 and 560 Is equally applicable to functions 564, 566, 568 and 570, respectively. In some embodiments, the respective functions may be configured in the same way (and in others differently). In fact, the output of the second Fourier transform function 560 (sixth data stream 506) may be fed back to the input of the first Fourier transform function 552 as the first data stream 501, either directly or with an intervening row-column transformation (transpose), since the operation of the forward and inverse transforms are identical. In this case, in effect, functions 564, 566, 568 and 570 are respectively replaced by functions 552, 554, 558 and 560, reusing the respective computing resources. Equally, as they perform the same operations on the received stream of data values, Fourier transform functions 552 and 560 can be replaced with a single Fourier transform function by routing the data value streams accordingly. In other words, in some embodiments, the first, second, third and/or fourth Fourier transform functions are a single Fourier transform function, although they may also be each a different, separate function.

Figure 8:
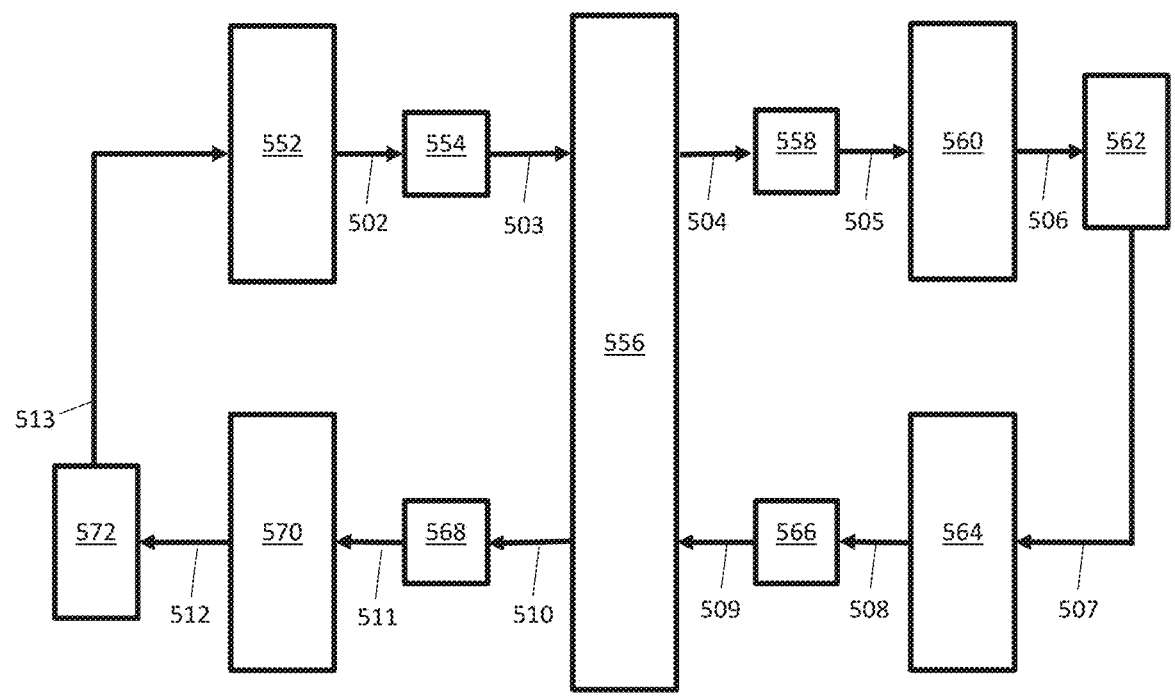
FIG. 8 illustrates an image processing system arranged to implement iterative computation suitable for computer generation of holograms.

With reference to FIG. 8, in some embodiments, the image data processing systems described above are combined for image processing to implement iterative computation of a computer-generated hologram as described above. Thus, the sixth data stream 506 calculated by a first iteration is not output as hologram data for display, but is instead converted, by inverse Fourier transform, for use as the input image data for the next iteration. A first magnitude function 562 is arranged to receive the sixth data stream 506 and to output the seventh data stream 507, with the third Fourier transform function 564 arranged to receive the seventh data stream from the first magnitude function 562. The first magnitude function 562 is arranged to replace the magnitude of the complex data values in the sixth data stream 506 before the inverse transform occurs, as described above, for example by setting all magnitudes to unity.

A second magnitude function 572 is arranged to receive the twelfth data stream 512 and to output the thirteenth data stream 513, which replaces the first data stream 501 for the next iteration of an algorithm for computer generation of holograms, as described above. The first Fourier transform function 552 is arranged to receive the thirteenth data stream 513 from the second magnitude function 572. The second magnitude function 572 is arranged to perform one or two functions.

On the one hand, the second magnitude function 572 is, in some embodiments, arranged to compare the magnitudes of the complex values in the twelfth data stream 512 with the corresponding magnitudes or pixel values of the input image, as described above, and to terminate the iterative algorithm if a goodness of fit condition is met as described above. In other embodiments, the stop condition is based on a number of iterations, for example, and not on a goodness of fit criterion. Regardless, if the stop criterion is met, the algorithm terminates and returns a computer-generated hologram based on the sixth data stream 506 (and corresponding sixth array, possibly transposed as required), for example returning an array of respective phase values as a phase-only hologram or an array of complex values as a fully complex hologram. The sixth data stream/array is thus held in memory until the stop criterion for the present iteration has been evaluated (which may occur as soon as the sixth data stream 506 has been fully calculated in case of a criterion on the number of iterations).

If a further iteration is required, that is the stopping criterion is not met, the second magnitude function 572 replaces the magnitude of the data values in the twelfth data stream 512, as described above, for example replacing the magnitudes with the respective one of the input image or a combination of the magnitudes and the respective ones of the input image, as described above.

Figure 9:
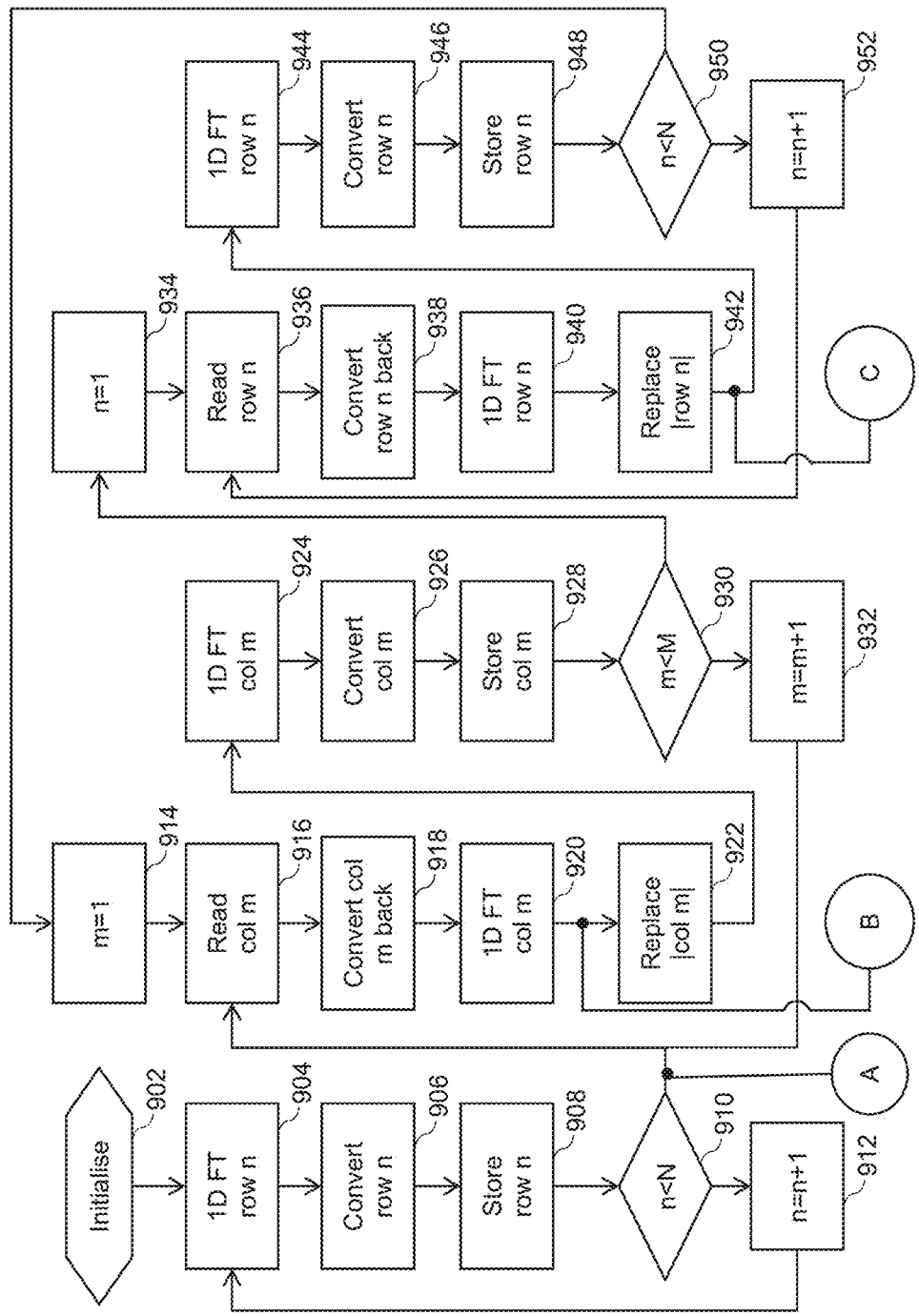
FIG. 9 illustrates methods of Fourier transforming and converting image data, implementing a 2D Fourier transform and iterative computation suitable for computer generation of holograms.

Corresponding methods of image processing are described with reference to FIG. 9. The methods may be implemented using the systems described above or in any other way. It will be understood that the description of features of the system components described above with reference to FIGS. 5 to 8 is equally applicable to the corresponding method steps, regardless of how they are implemented. The disclosure of the method steps below thus includes the respective specific disclosures made above.

At step 902, the method is initialised, initialising counter variables m=1 and n=1 indexing a 2D N×M array of complex data values in Cartesian form to be processed and the array itself, for example based on an image for which a computer-generated hologram is to be computed as described above, although the method is not so limited and may be used for other image processing techniques. It will be appreciated that in embodiments where the data values are streamed column by column/row by row as the case may be, explicit counters are not required and the processing can be driven by the streaming of the data, either counting data values or relying on flags in the data stream that indicate the end of each row, column and/or the array.

At step 904 the nth row is Fourier transformed and the result is converted at step 906, first to polar form and then to a lower bit number format/representation. The nth row is stored in memory in this form at step 908 and step 910 checks if the nth row is the last row of the array. If not n is incremented (or in a streamed implementation, the next M values are received from the stream) and steps 904 to 910 are repeated until the last row has been processed. In some embodiments simply providing a compressed data set for further processing, the process ends at this stage outputting or storing the resulting array, as indicated by break point A in FIG. 9.

In other embodiments, the method proceeds to step 916, at which, for example, the first column of data values is read from memory and then converted back at step 918, first into the original number format or representation (or at least one that requires more bits than the low bit one) and then back from polar into Cartesian form. The column of data values is then Fourier transformed at step 920. In some embodiments, in which the method provides a 2D Fourier transform without further processing as described below, the method loops back from break point B in FIG. 9 to repeat steps 916 to 920 until the array has been processed column by column and the method terminates, outputting or storing the resulting array.

In other embodiments providing an iterative process for calculating a computer-generated hologram, once the column has been transformed at step 920, the magnitudes of the data values are replaced, for example with unity, as described above, and the resulting column is Fourier transformed at step 924, converted at step 926 and stored at step 928 in line with the description of steps 904 to 908 with rows replaced by columns. At step 930, it is checked if all columns have been processed. If not, the process increments m at step 932 (unless implicit in a streaming implementation as discussed above). In some embodiments, steps 916 to 920 and 922 to 928 may be interleaved so that while a column m is processed and then stored at steps 922 to 928, the next column m+1 is read and processed at steps 916 to 920, as long as there is a next column.

If all columns have been determined to have been processed at step 930, the process proceeds to step 934 to reset n (unless not required in a streaming implementation—see above). At step 936 the, for example, first row is read from memory. It will be understood that step 908 write rows to memory as sequential data values and step 916 reads out every Mth value out in sequence to read out a sequence of columns, which are then written as a sequence of columns at step 928 and read out every Nth value at step 936 to read out a sequence of rows again and so forth, writing sequential rows at step 948 described below to loop back and start over reading out a sequence of columns (skip M) at step 916 to close the loop. Thus, rows and columns as referred to with reference to FIG. 9 refer to rows and columns of the original array, transformed at each step of the method.

At step 938, the row read at step 936 is converted back as described above for step 918 and the converted back row is Fourier transformed at step 940. At step 942, the magnitudes of the row are replaced based on the image to be represented, as described above and a next iteration begins with the being Fourier transformed at step 944, converted as described above for step 906 at step 946 and stored in memory at step 948. Step 950 checks that all rows have been processed. If not, n is incremented at step 952, unless this is implicit in the streaming implementation as discussed above and the method loops back to step 936 to read the next row. If, on the other hand, it is determined at step 950 that all rows have been processed, the method loops back to step 914 to reset m (unless this is not necessary in a streaming implementation—see above) and the method proceeds at step 916. The method thus, in some embodiments implements an iterative algorithm for calculating computer-generated holograms, with steps 902 to 942 corresponding to a first iteration of the algorithm and repetitions of steps 944 to 942, via steps 914 to 940 corresponding to subsequent iterations.

In some embodiments, a stopping criterion is defined in terms of a set number of iterations. In these embodiments, the method stops at point B once the number of iterations is reached and all columns have been processed in the last iteration. The data values at that point, i.e. as Fourier transformed at step 920, are used to form the hologram and are hence stored for all columns for this purpose at least in the last iteration (i.e. transformed since the last passage of step 902 or 914). For example, the phases of the data values may be used as a phase-only hologram, as described above, with a transpose of the corresponding array if required.

In some embodiments, a stopping criterion is defined in terms of a goodness of fit of a magnitude distribution of magnitudes of the data values of the arrays as compared to the original input image, as described in detail above. The measure of goodness of fit is determined at break point C and if it is determined at this point that the algorithm has sufficiently converged and is to terminate, the data values of the columns transformed at step 922 since the last step 902 or 914 are used to construct the hologram as described above. To this end, it may be convenient to simply maintain a store of columns of data values produced by step 920 for all columns in the array, with each column overwritten by its corresponding column of the next iteration, or in any other suitable way.

Thus, when the stopping criterion is met, the method may output the hologram representative of the input image for display. For example, the method may output the hologram to a holographic display device as described herein. The hologram may be a phase-only hologram or a fully complex hologram comprising a phase and an amplitude component. The method may receive a sequence of input images from an image source (e.g. video camera) in real-time and output a sequence of holograms representative of the respective images in real-time. As a result, the method may process images as they are received, in real time, that is at low latency. Reduced latency is possible as a result of the compression of complex image data as described herein. Furthermore, errors in the image data are reduced by performing compression of a polar coordinate representation of the complex image data. In some embodiments, the method may display each hologram on a holographic display device, such as a spatial light modulator arranged to display the hologram, and illuminate the spatial light modulator with light so as to form a holographic reconstruction or holographic replay image.

According to the described method, the transformation of large data sets of complex numbers corresponding to image data necessary for generating corresponding holograms, or for processing images, as described herein may be performed with reduced computational resources, for example reduced memory capacity and processing power, as described herein. In addition, computer-generated holograms, or processed images, may be calculated with increased speed and accuracy, as described herein.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser. In some embodiments, the detector is a photodetector. In some embodiments, the light receiving surface is a screen or a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European Pat. No. 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

However, the resulting holographic reconstruction can still suffer from "speckle" if a coherent light source, such as a laser, is used. Speckle is well-known and is the result of interference of light scattered off an optically rough surface. It is desirable to reduce such speckle. Embodiments include elements and techniques which reduce the perceived speckle in the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for $1/75$th of a second, then the green laser would be fired for $1/75$th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

Computing Device

Figure 10:
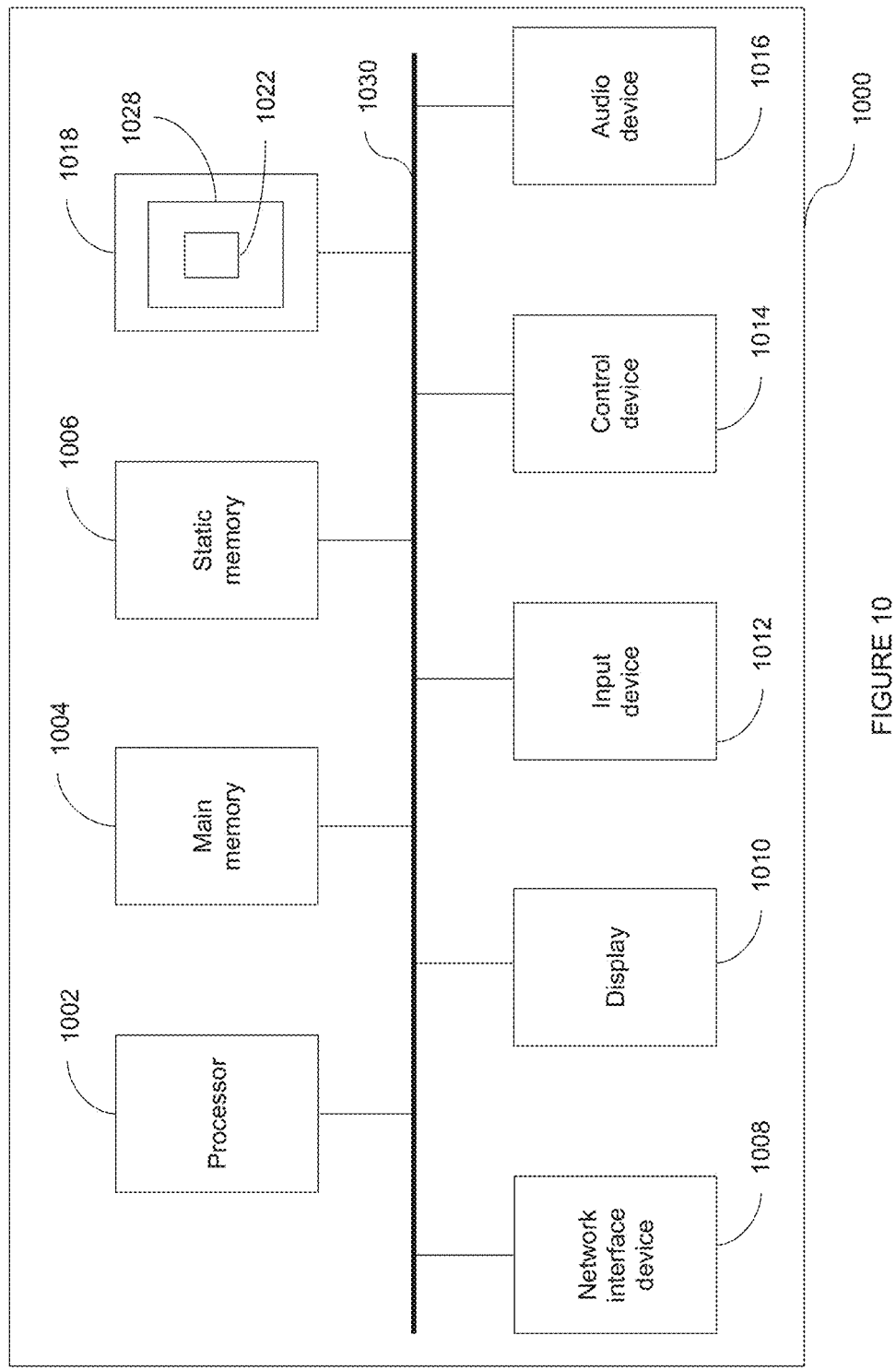
FIG. 10 illustrates a computing device.

FIG. 10 illustrates a block diagram of one implementation of a computing device 1000 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory (e.g., a data storage device 1018), which communicate with each other via a bus 1030.

Processing device 1002 represents one or more general-purpose processors such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the processing logic (instructions 1022) for performing the operations and steps discussed herein.

The computing device 1000 may further include a network interface device 1008. The computing device 1000 also may include a video display unit 1010 (e.g., a liquid crystal display (LCD) or a cathode ray tube (CRT)), an alphanumeric input device 1012 (e.g., a keyboard or touchscreen), a cursor control device 1014 (e.g., a mouse or touchscreen), and an audio device 1016 (e.g., a speaker).

The data storage device 1018 may include one or more machine-readable storage media (or more specifically one or more non-transitory computer-readable storage media) 1028 on which is stored one or more sets of instructions 1022 embodying any one or more of the methodologies or functions described herein. The instructions 1022 may also reside, completely or at least partially, within the main memory 1004 and/or within the processing device 1002 during execution thereof by the computer system 1000, the main memory 1004 and the processing device 1002 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

The description makes reference to data processing functions such as Fourier transform functions, conversion functions, transformation functions and the like. It will be understood that these functions can be implemented in respective dedicated hardware components, shared between or share hardware components, be implemented, for example in respective modules, in software, for example firmware, middle ware or the like, or in hardware.

Unless specifically stated otherwise, as apparent from the following discussion, it is appreciated that throughout the description, discussions utilizing terms such as "receiving", "determining", "comparing", "enabling", "maintaining", "identifying", "transforming", "converting", "storing", "reading" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any tangible, non-transitory medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

Additional Disclosed Aspects and Embodiments

The following aspects and embodiments are disclosed:

A system arranged to perform a complex Fourier transform of a complex data set corresponding to an image, wherein the system comprises:
  a first Fourier transform function arranged to receive a complex data set and perform a first 1D complex Fourier transform of the complex data set in Cartesian form;
  a first data conversion function arranged to receive the complex data set processed by the first Fourier transform function, convert the complex data set into polar form and compress the complex data set in polar form;
  a row-column transformation function arranged to receive the complex data set processed by the first data conversion function and perform a row-column transformation of the complex data set;
  a second data conversion function arranged to receive the complex data set processed by the row-column transformation function, decompress the complex data set and convert the complex data set back into Cartesian form; and
  a second Fourier transform function arranged to receive the complex data set processed by the second data conversion function and perform a second 1D complex Fourier transform of the complex data in Cartesian form, wherein the second 1D complex Fourier transform is orthogonal to the first 1D complex Fourier transform.

The system as listed in item 1 wherein the first data conversion function is arranged to compress the complex data set in polar form by multiplying each magnitude value by a scaling factor.

The system as listed in any preceding item wherein the first data conversion function is arranged to compress the complex data set in polar form by converting each magnitude value and each phase value of the complex data set from x bit to y bit, where x>y.

The system as listed in item 3 wherein the first data conversion function is arranged to compress the complex data set in polar form by thresholding any magnitude values above a maximum permitted value to the maximum permitted value.

The system as listed in item 4 wherein the maximum permitted value is the maximum permitted value with y bits.

The system as listed in any preceding item wherein the first data conversion function is arranged to compress the complex data set by quantising the phase values.

The system as listed in any preceding item wherein the second data conversion function is arranged to decompress the complex data set by converting each magnitude value and each phase value from y bit back to x bit and multiplying each magnitude value by the inverse of the scaling factor.

The system as listed in any preceding item wherein the row-column transformation function is arranged to perform the row-column transformation by writing the received complex data set to memory and reading-out the complex data set from the memory in a different order to that received.

The system as listed in item 8 wherein the memory is static random access memory.

A system arranged to perform a complex inverse Fourier transform of a complex data set corresponding to an image, wherein the system comprises:
- a first inverse Fourier transform function arranged to receive a complex data set and perform a first 1D complex inverse Fourier transform of the complex data set in Cartesian form;
- a third data conversion function arranged to receive the complex data set processed by the first inverse Fourier transform function, convert the complex data set into polar form and compress the complex data set in polar form;
- a row-column transformation function arranged to receive the complex data set processed by the first data conversion function and perform a row-column transformation of the complex data set;
- a fourth data conversion function arranged to receive the complex data set processed by the row-column transformation function, decompress the complex data set and convert the complex data set back into Cartesian form; and
- a second inverse Fourier transform function arranged to receive the complex data set processed by the second data conversion function and perform a second 1D complex inverse Fourier transform of the complex data in Cartesian form, wherein the second 1D complex inverse Fourier transform is orthogonal to the first 1D complex inverse Fourier transform.

The system as listed in item 10 wherein the third data conversion function is arranged to compress the complex data set in polar form by multiplying each magnitude value by a scaling factor.

The system as listed in item 10 or 11 wherein the third data conversion function is arranged to compress the complex data set in polar form by converting each magnitude value and each phase value of the complex data set from x bit to y bit, where x>y.

The system as listed in item 12 wherein the third data conversion function is arranged to compress the complex data set in polar form by thresholding any magnitude values above a maximum permitted value to the maximum permitted value.

The system as listed in item 13 wherein the maximum permitted value is the maximum permitted value with y bits.

The system as listed in any of items 10 to 14 wherein the third data conversion function is arranged to compress the complex data set by quantising the phase values.

The system as listed in any of items 10 to 15 wherein the fourth data conversion function is arranged to decompress the complex data set by converting each magnitude value and each phase value from y bit back to x bit and then multiplying each magnitude value by the inverse of the scaling factor.

The system as listed in any of items 10 to 16 wherein the row-column transformation function is further arranged to write the received complex data set to memory and read-out the complex data set from the memory in a different order to that received so as to perform the row-column transformation.

The system as listed in item 17 wherein the memory is static random access memory.

A system arranged to process complex data sets corresponding to an image, the system comprising:
- the data processing system of any of items 1 to 9;
- the data processing system of any of items 10 to 18; and
- a data processor arranged to: receive the complex data set processed by the second Fourier transform function and replace the magnitude values to form the complex data set received by the first inverse Fourier transform function; and/or receive the complex data set processed by the second inverse Fourier transform function and replace the magnitude values to form the complex data set received by the first Fourier transform function.

The system as listed in any preceding item wherein the first 1D complex Fourier transform is orthogonal to the first 1D complex inverse Fourier transform.

The system as listed in any preceding item wherein the complex data set is processed by the system as a 1D data stream.

The system as listed in any preceding item wherein the complex data is processed by the system on a serial bus.

The system as listed in any preceding item further comprising a controller arranged to output a hologram representative of the image in the spectral domain.

The system as listed in item 22 wherein the hologram is a phase-only hologram or a fully complex hologram comprising a phase and an amplitude component.

The system as listed in item 22 or 23 wherein the controller is arranged to receive a sequence of images in real-time and output a sequence of holograms representative of the respective images in the spectral domain in real-time.

The system as listed in any of items 22 to 24 further comprising a spatial light modulator arranged to display the hologram and a light source arranged to illuminate the spatial light modulator.

A method of performing a complex Fourier transform of a complex data set corresponding to an image, the method comprising the ordered steps of:
- receiving a complex data set and performing a first 1D complex Fourier transform of the complex data set in Cartesian form;
- converting the complex data set into polar form and compressing the complex data set in polar form;
- performing a row-column transformation of the complex data set;
- decompressing the complex data set and converting the complex data set back into Cartesian form;
- performing a second 1D Fourier transform of the complex data set in Cartesian form, wherein the second 1D complex Fourier transform is orthogonal to the first 1D complex Fourier transform.

A method of performing a complex inverse Fourier transform of a complex data set corresponding to an image, the method comprising the ordered steps of:
- receiving a complex data set and performing a first 1D complex inverse Fourier transform of the complex data set in Cartesian form;
- converting the complex data set into polar form and compressing the complex data set in polar form;
- performing a row-column transformation of the complex data set;
- decompressing the complex data set and converting the complex data set back into Cartesian form;
- performing a second 1D inverse Fourier transform of the complex data set in Cartesian form, wherein the second 1D complex inverse Fourier transform is orthogonal to the first 1D complex inverse Fourier transform.

A method as listed in items 26 and 27 further comprising:
replacing the magnitude values of the complex data set resulting from the method of item 26 to form the complex data set received in accordance with item 27; and/or replacing the magnitude values of the complex data set resulting from the method of item 27 to form the complex data set received in accordance with item 26.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims.

Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An image processing system, comprising:
one or more processors, arranged to perform a Fourier transform of a first complex data set corresponding to an image, wherein the first complex data set comprises a two-dimensional array of complex values in Cartesian form each represented in a first number format with a first number of bits, the values of the two-dimensional array representing pixels of the image, the two-dimensional array having a first dimension and a second dimension, the two-dimensional array defining first linear arrays of complex values representing pixels along the first dimension and second linear arrays of complex values representing pixels along the second dimension;
tangible, non-transitory, computer-readable media storing instructions executable by the one or more processors, wherein the instructions, when executed, cause the image processing system to perform functions comprising:
performing a 1D Fourier transform of each first linear array of complex values of the first complex data set in Cartesian form;
converting each complex value of each Fourier transformed first linear array to polar form;
converting each complex value in polar form of each of the first linear arrays to a second number format with a second number of bits less than the first number of bits;
storing the complex values in the second number format of each of the first linear arrays in a memory, first linear array by first linear array to provide a two-dimensional array of complex values in the second number format; then
reading out the complex values of the two-dimensional array of complex values in the second number format from the memory, second linear array by second linear array;
converting each complex value of each of the second linear arrays read from the memory back to the first number format;
converting each complex value converted back to the first number format of each of the second linear arrays back to Cartesian form;
performing a 1D Fourier transform of each second linear array of complex values converted back to Cartesian form, wherein the Fourier transformed second linear arrays of values are used to form a second complex data set; and
forming image data using the second complex data set; and
a controller arranged to output the image data for display.

2. The image processing system of claim 1, wherein each of the complex values of the Fourier transformed second linear array of values comprises a magnitude and a phase, and the functions further comprise:
replacing the magnitudes of the complex values of the Fourier transformed second linear arrays of values to form the second complex data set, wherein the first linear arrays in the second complex data set correspond to the second linear arrays in the first complex data set.

3. The image processing system of claim 1, wherein converting each complex value in polar form of each of the first linear arrays to the second number format comprises multiplying each magnitude by a scaling factor.

4. The image processing system of claim 1, wherein each complex value in polar form of each of the first linear arrays has a magnitude and a phase, and wherein converting the complex values in polar form of each of the first linear arrays to the second number format comprises converting each magnitude from x1 bit to y1 bit, where x1>y1 and each phase from x2 bit to y2 bit, where x2>y2.

5. The image processing system of claim 4, wherein converting each complex value in polar form of each of the first linear arrays to the second number format comprises setting any magnitudes above a maximum permitted value to the maximum permitted value.

6. The image processing system of claim 1, wherein each complex value in polar form of each of the first linear arrays has a magnitude and a phase, and wherein converting each complex value in polar form of each of the first linear arrays to the second number format comprises quantising the phase of the complex value in polar form with a lower number of levels than in the first number format.

7. The image processing system of claim 4, wherein each complex value of each second linear array read from the memory has a magnitude and a phase, and wherein converting each complex value of each second linear array to the first number format comprises converting each magnitude from y1 bit back to x1 bit and each phase from y2 bit back to x2 bit and multiplying each magnitude by the inverse of the scaling factor.

8. The image processing system of claim 1, wherein the functions further comprise:
processing one first linear array while processing another first linear array; and
processing one second linear array while processing another second linear array.

9. The image processing system of claim 1, wherein the functions further comprise:
receiving the first complex data set as a stream.

10. The image processing system of claim 1, wherein the functions further comprise:
performing a Fourier transform of the second complex data set, wherein the second complex data set comprises a two-dimensional array of complex values in Cartesian form each represented in a third number format with a third number of bits, the two-dimensional array defines first linear arrays of values along the second dimension and second linear arrays of values along the first dimension;
performing a 1D Fourier transform of each first linear array of the second complex data set;

converting each complex value of each first linear array of the second complex data set to polar form;
converting each complex value in polar form of each of the first linear arrays of the second complex data set to a fourth number format with a fourth number of bits less than the third number of bits;
storing the complex values in the fourth number format of each of the first linear arrays of the second complex data set in a further memory first linear array of the second complex data set by first linear array of the second complex data set to provide a two-dimensional array of complex values in the fourth number format;
reading out the complex values of the two-dimensional array of complex values in the fourth number format from the memory, second linear array of the second complex data set by second linear array of the second complex data set;
converting each complex value of each of the second linear arrays of the second complex data set back to the third number format and convert each complex value converted back to the third number format back to Cartesian form;
performing a 1D Fourier transform of each second linear array of the second complex data set; and
replacing the magnitude values to form a respective one of the second complex data set and first complex data set received, wherein the first linear arrays in the second complex data set correspond to the second linear arrays in the first complex data set.

11. The image processing system of claim 1, wherein outputting the image data for display comprises outputting a hologram representative of the image data for display.

12. The image processing system of claim 11, wherein the controller is arranged to receive a sequence of images in real-time and output a sequence of holograms representative of the respective images in real-time.

13. The image processing system of claim 11, further comprising:
a holographic display device arranged to display the hologram.

14. A method comprising:
providing a first complex data set corresponding to an image, wherein the first complex data set comprises a two-dimensional array of complex values in Cartesian form each represented in a first number format with a first number of bits, the values of the two-dimensional array representing pixels of the image, the two-dimensional array having a first dimension and a second dimension, the two-dimensional array defining first linear arrays of complex values representing pixels along the first dimension and second linear arrays of complex values representing pixels along the second dimension;
performing a 1D Fourier transform of each first linear array of complex values of the first complex data set in Cartesian form;
converting each complex value of each Fourier transformed first linear array to polar form;
converting each complex value in polar form of each of the first linear arrays to a second number format with a second number of bits less than the first number of bits;
storing the complex values in the second number format of each of the first linear arrays in a memory, first linear array by first linear array to provide a two-dimensional array of complex values in the second number format; then reading out the complex values from the memory, second linear array by second linear array;
converting each complex value of each of the second linear arrays read from the memory back to the first number format;
converting each complex value converted back to the first number format of each of the second linear arrays back to Cartesian form;
performing a 1D Fourier transform of each second linear array of complex values converted back to Cartesian form, wherein the Fourier transformed second linear arrays of values are used to form a second complex data set;
forming image data using the second complex data set; and
outputting the image data for display.

15. The method of claim 14, wherein of the complex values of the Fourier transformed second linear array of values comprises a magnitude and a phase, the method further comprising:
replacing the magnitudes of the complex values of each Fourier transformed second linear array to form a respective second linear array of further complex values;
performing a 1D Fourier transform of each second linear array of further complex values;
converting each further complex value of each Fourier transformed second linear array to further complex values in polar form each in a further first number format having a further first number of bits;
converting each further complex value in polar form to a further complex value in a further second number format with a further second number of bits less than the further first number of bits;
storing the further complex values in the further second number format in a memory-, second linear array by second linear array to provide a two-dimensional array of complex values in the further second number format;
reading out the further values in the further second number format from the memory-, further first linear array by further first linear array;
converting each further complex value of each further first linear array read from the memory back to the further first number format;
converting each further complex value of each further first linear array converted back to the first number format back to Cartesian form; and
performing a 1D Fourier transform of each further first linear array of further complex values converted back to Cartesian form.

16. The method of claim 14, wherein each complex value in polar form of each of the first linear arrays has a magnitude and a phase, and wherein converting each complex value in polar form to the second number format comprises one or more of:
converting each magnitude from x1 bit to y1 bit, where x1>y1 and each phase from x2 bit to y2 bit, where x2>y2;
setting any magnitudes above a maximum permitted value to the maximum permitted value; and
quantising the phases with a lower number of levels than in the first number format.

17. The method of claim 14, comprising the Fourier transforming one first linear array while converting another first linear array, wherein Fourier transforming one second linear array while converting another second linear array, or both.

18. The method of claim 14, wherein outputting the image data for display comprises:

outputting a hologram representative of the image data.

19. The method of claim 18, further comprising:
receiving a sequence of images in real-time and outputting a sequence of holograms representative of the respective images in real-time.

20. The method of claim 18, further comprising:
displaying the hologram on a holographic display device, displaying the hologram on a spatial light modulator and illuminating the spatial light modulator.

* * * * *